US009742252B2

(12) United States Patent
Annis

(10) Patent No.: US 9,742,252 B2
(45) Date of Patent: Aug. 22, 2017

(54) MAGNETIC ELECTRICITY GENERATOR

(71) Applicant: Transducing Energy Devices, LLC, Ann Arbor, MI (US)

(72) Inventor: Theodore C. Annis, Ann Arbor, MI (US)

(73) Assignee: Transducing Energy Devices, LLC, Ann Arbor, MI (US)

( * ) Notice: Subject to any disclaimer, the term of this patent is extended or adjusted under 35 U.S.C. 154(b) by 663 days.

(21) Appl. No.: 14/306,805

(22) Filed: Jun. 17, 2014

(65) Prior Publication Data

US 2015/0364979 A1 Dec. 17, 2015

(51) Int. Cl.
| | | |
|---|---|---|
| *H02K 21/38* | (2006.01) |
| *H02K 21/40* | (2006.01) |
| *H02K 21/42* | (2006.01) |
| *H02K 21/24* | (2006.01) |
| *H02K 16/04* | (2006.01) |
| *H02K 1/17* | (2006.01) |
| *H02K 1/14* | (2006.01) |

(52) U.S. Cl.
CPC ............ *H02K 21/38* (2013.01); *H02K 1/141* (2013.01); *H02K 16/04* (2013.01); *H02K 21/24* (2013.01); *H02K 21/40* (2013.01); *H02K 21/42* (2013.01)

(58) Field of Classification Search
CPC ........ H02K 21/38; H02K 21/40; H02K 21/42; H02K 1/141; H02K 1/143; H02K 21/225; H02K 21/18; H02K 19/24; H02K 1/17; H02K 16/04; H02K 21/026; H02K 21/185; H02K 21/24; H02K 37/16; H02K 53/00; H02K 1/2793

USPC .... 310/46, 166–172, 216.021–216.039, 153, 310/154, 155, 156, 49.09, 49.22, 49.41, 310/178, 190, 192, 266, 113, 268
See application file for complete search history.

(56) References Cited

U.S. PATENT DOCUMENTS

| | | | | |
|---|---|---|---|---|
| 3,673,446 A | * | 6/1972 | Watai ..................... | H01H 53/10 310/172 |
| 3,745,388 A | * | 7/1973 | Frederick ............... | H02K 37/08 310/264 |
| 5,606,230 A | * | 2/1997 | Drury ................. | B60L 11/1805 310/102 R |

(Continued)

FOREIGN PATENT DOCUMENTS

| | | | | |
|---|---|---|---|---|
| DK | WO 0133700 A1 | * | 5/2001 | ................ B62J 6/06 |
| JP | WO 9411940 A1 | * | 5/1994 | ............. H02K 21/38 |

OTHER PUBLICATIONS

Ijima (WO 9411940 A1, English translation).*

(Continued)

*Primary Examiner* — Naishadh Desai
*Assistant Examiner* — Alexander Moraza
(74) *Attorney, Agent, or Firm* — John G. Posa; Belzer PC

(57) ABSTRACT

An electricity generator using a six-segment rotating flux switch, a 2×2 switching sequence with four magnetic flux switch sites, and a unique magnetic circuit design, all of which together alternate the magnetic flux from a stationary permanent magnet through a stationary magnetic segment around which is wound a pickup coil thereby inducing electricity in the pickup coil. Both the vector direction and the scalar value of the magnetic flux are alternated within the stationary magnetic segment resulting in a high power output of AC electricity.

1 Claim, 9 Drawing Sheets

(56) References Cited

U.S. PATENT DOCUMENTS

| | | |
|---|---|---|
| 6,246,561 B1 | 6/2001 | Flynn |
| 6,362,718 B1 | 3/2002 | Patrick et al. |
| 6,946,938 B1 | 9/2005 | Pedersen |
| 7,804,386 B2* | 9/2010 | Yonnet .................. F01L 9/04 |
| | | 123/90.11 |
| 2005/0116569 A1* | 6/2005 | Fahy ..................... C23F 11/00 |
| | | 310/168 |
| 2005/0156702 A1 | 7/2005 | Marshall |
| 2007/0194647 A1* | 8/2007 | Maeda ................. H02K 99/20 |
| | | 310/152 |
| 2008/0001491 A1* | 1/2008 | Qu ...................... H02K 19/103 |
| | | 310/179 |
| 2009/0096219 A1 | 4/2009 | Annis et al. |
| 2009/0121571 A1* | 5/2009 | Onuma ............... F04D 29/058 |
| | | 310/90.5 |
| 2013/0015741 A1* | 1/2013 | Kim ..................... H02K 21/18 |
| | | 310/114 |
| 2013/0093295 A1* | 4/2013 | Rabal .................. H02K 47/14 |
| | | 310/68 B |
| 2014/0091890 A1 | 4/2014 | Annis et al. |

OTHER PUBLICATIONS

Konrad et al., An Improved Method for Virtual Air Gap Length Computation, *IEEE Transactions on Magnetics*, 41(10), Oct. 2005.
Moskowitz, "Permanent Magnet Design and Application Handbook" 1995, p. 52.
U.S. Navy publication, "Navy Electricity and Electronics Series, Module 8—Introduction to Amplifiers", pp. 3-64 to 3-66, Sep. 1998.

* cited by examiner

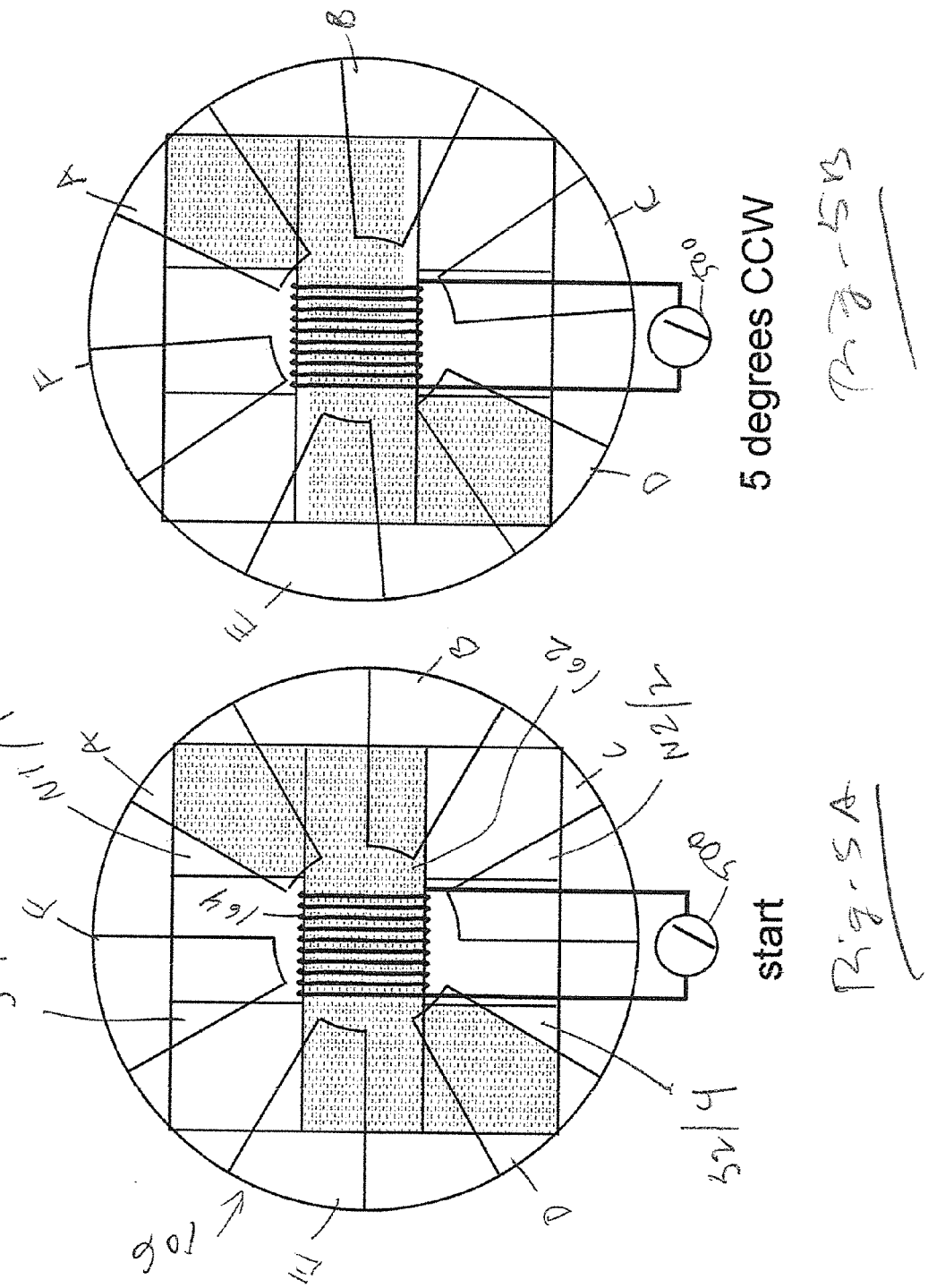

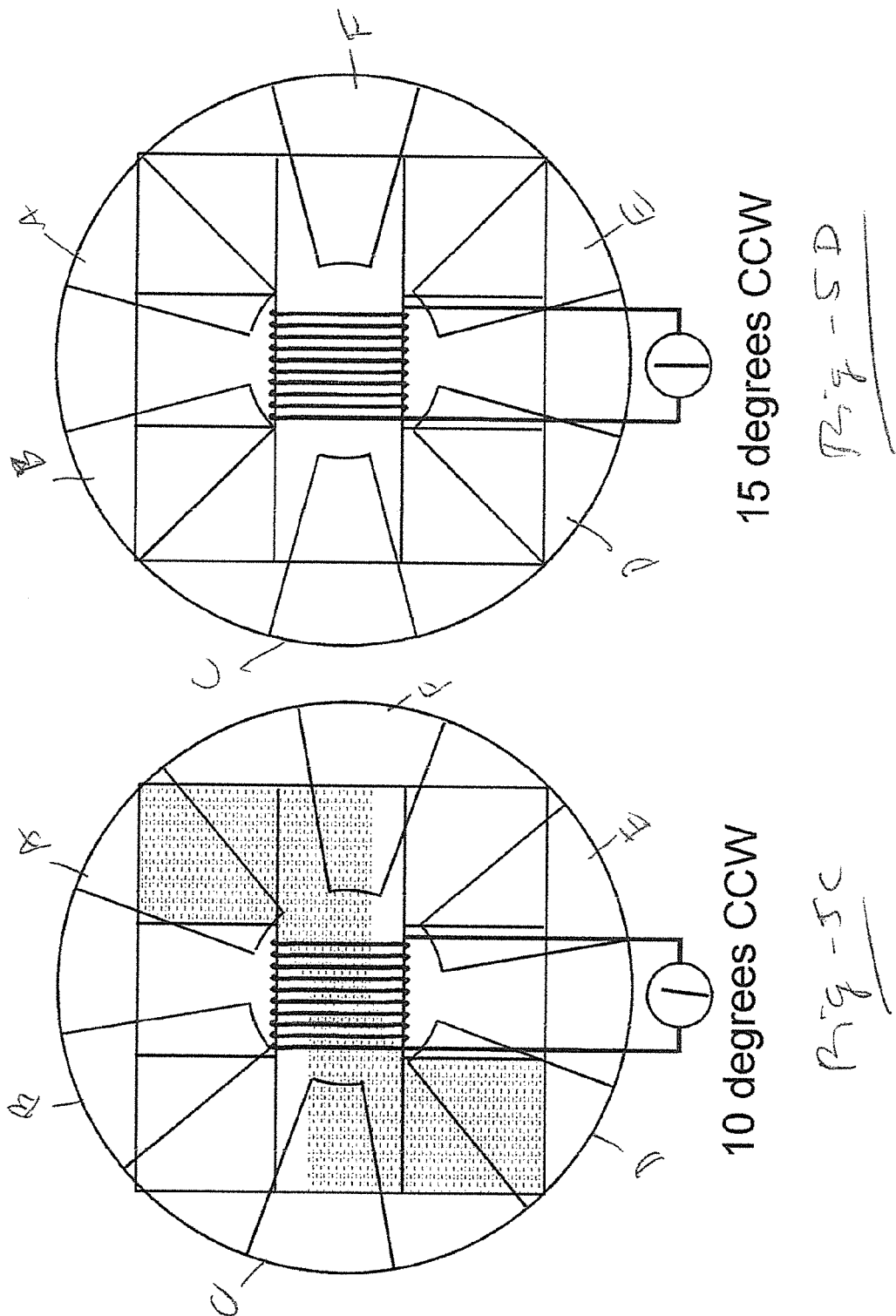

25 degrees CCW 20 degrees CCW 30 degrees CCW

MAGNETIC ELECTRICITY GENERATOR

FIELD OF THE INVENTION

This invention relates generally to electrical energy generation and, in particular, to methods and apparatus wherein magnetic flux is switched through a flux path to produce electricity.

BACKGROUND OF THE INVENTION

Magnetic flux may exist in "free-space," in materials that have the magnetic characteristics of free-space, and in materials with magnetically conductive characteristics. The degree of magnetic conduction in magnetically conductive materials is typically indicated with a B-H hysteresis curve, by a magnetization curve, or both.

Permanent magnets may now be composed of materials that have a high coercively (Hc), a high magnetic flux density (Br), a high magneto motive force (mmf), a high maximum energy product (BHmax), with no significant deterioration of magnetic strength over time. An example is the N52 NdFeB permanent magnet from magnet supplier, www.magnet4sale.com, which has an Hc of 1,079,000 Amperes/meter, a Br of 1.427 Tesla, an mmf ranging up to 575,000 Ampere-turns, and a BHmax of 392,000 Joules/meter$^3$.

According to Moskowitz, "Permanent Magnet Design and Application Handbook" 1995, page 52, magnetic flux may be thought of as flux lines which always leave and enter the surfaces of ferromagnetic materials at right angles, which never can make true right-angle turns, which travel only in straight or curved paths, which follow the shortest distance, and which follow the path of lowest reluctance (resistance to magneto motive force).

Free space presents a high reluctance path to magnetic flux. There are many materials that have the magnetic characteristics similar to those of free space. There are other materials that offer a low or lower reluctance path for magnetic flux, and it is these materials that typically comprise a defined and controllable magnetic path.

High-performance magnetic materials for use as magnetic paths within a magnetic circuit are now available and are well suited for the (rapid) switching of magnetic flux with a minimum of eddy currents. Certain of these materials are highly nonlinear and respond to a "small" applied magneto motive force (mmf) with a robust generation of magnetic flux (B) within the material. The magnetization curves of such materials show a high relative permeability (ur) until the "knee of the curve" is reached, at which point ur decreases rapidly approaching unity as magnetic saturation (Bs) is reached.

A "reluctance switch" is a device or means that can significantly increase or decrease the reluctance of a magnetic path. This is ideally done in a direct and rapid manner, while allowing a subsequent restoration to the previous reluctance, also in a direct and rapid manner. A reluctance switch typically has analog characteristics. By way of contrast, an off/on electric switch typically has a digital characteristic, as there is no electricity "bleed-through." With the current state of the art, however, reluctance switches exhibit some magnetic flux bleed-through. Reluctance switches may be implemented mechanically, such as to cause keeper movement to create an air gap, or rotating a lower reluctance material through an air gap (a high reluctance path segment) or electrically by various other means.

One electrical reluctance switch implementation uses a control coil or coils wound around a magnetic path or a sub-member that affects the path. U.S. Navy publication, "Navy Electricity and Electronics Series, Module 8—Introduction to Amplifiers" September 1998, page 3-64 to 3-66 describes how to modulate alternating current by changing the reluctance of the entire primary magnetic path by these means, one of which is used in a saturable-core reactor and the other in a magnetic amplifier. Flynn, U.S. Pat. No. 6,246,561; Patrick et al., U.S. Pat. No. 6,362,718; Pedersen, U.S. Pat. No. 6,946,938; Marshall, and US Patent Application 2005/01256702-A1 all disclose methods and apparatus that employ this type of reluctance switch for switching magnetic flux from a stationary permanent magnet or magnets for the purpose of generating electricity (and/or motive force).

Another electrical means of implementing a reluctance switch is the placement within the primary magnetic path of certain classes of materials that change (typically increase) their reluctance upon the application of electricity. A different way of implementing a reluctance switch is to saturate a sub-region of a primary magnetic path by inserting conducting electrical wires into the material comprising the primary magnetic path. Such a technique is described by Konrad and Brudny in "An Improved Method for Virtual Air Gap Length Computation," in IEEE Transactions on Magnetics, Vol. 41, No. 10, October 2005. A further electrical means of implementing a reluctance switch is described by Valeri Ivanov of Bulgaria on the website www.inkomp-delta.com.

SUMMARY OF THE INVENTION

An electricity generator using a six-segment rotating flux switch, a 2×2 switching sequence with four magnetic flux switch sites, and a unique magnetic circuit design, all of which together alternate the magnetic flux from a stationary permanent magnet through a stationary magnetic segment around which is wound a pickup coil thereby inducing electricity in the pickup coil. Both the vector direction and the scalar value of the magnetic flux are alternated resulting in a high power output of AC electricity.

BRIEF DESCRIPTION OF THE DRAWINGS

FIGS. 5A-5G illustrate how an alternating current is induced in a coil via rotation of the disk.

DETAILED DESCRIPTION OF THE INVENTION

Figure 1:
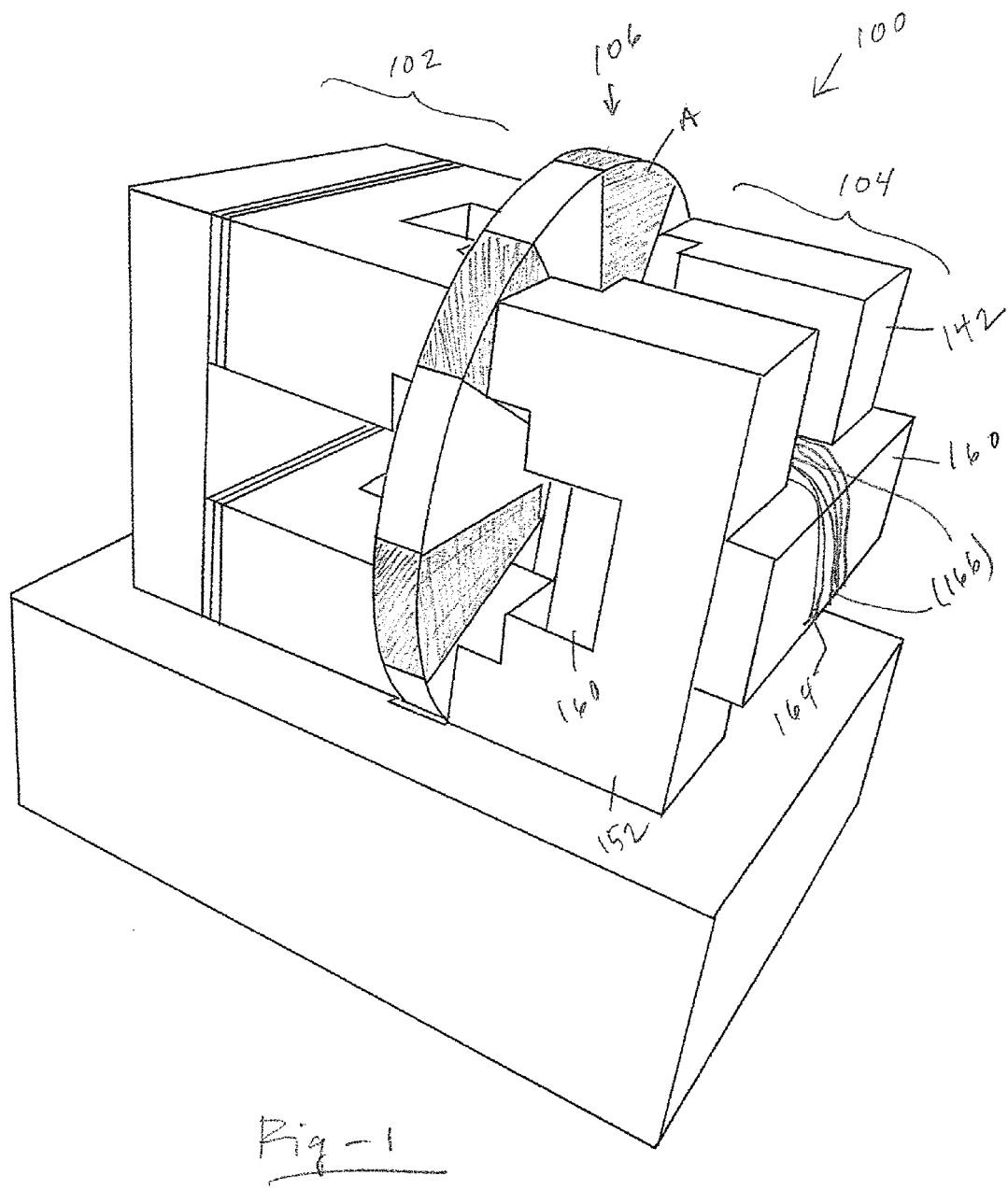
FIG. 1 is an oblique drawing of a preferred embodiment of the invention.

FIG. 1 is an oblique drawing of a preferred embodiment of the invention depicted generally at 100. The apparatus broadly comprises a magnetic flux delivery subsystem 102 and an electromagnetic induction subsystem 104 separated by a rotating disk 106. As will be seen, in contrast to typical electrical generators, the system induces electricity in a stationary winding, wound around a magnetic path in which electricity is generated to a varying magnetic field, thereby generating electrical energy, without the use of rotating windings.

Figure 2:
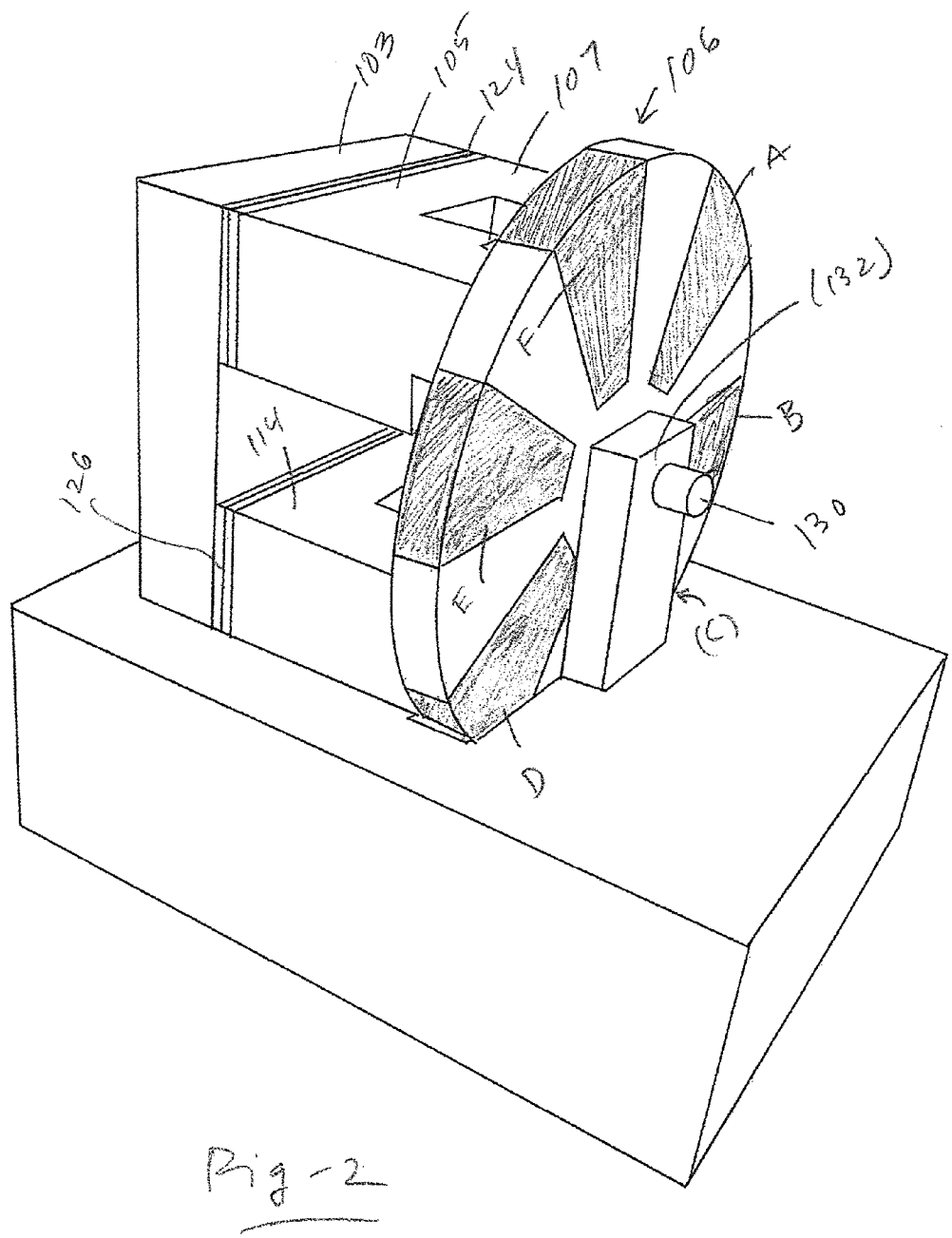
FIG. 2 is a detail drawing of the magnetic flux delivery subsystem including the rotating disk.
Figure 3:
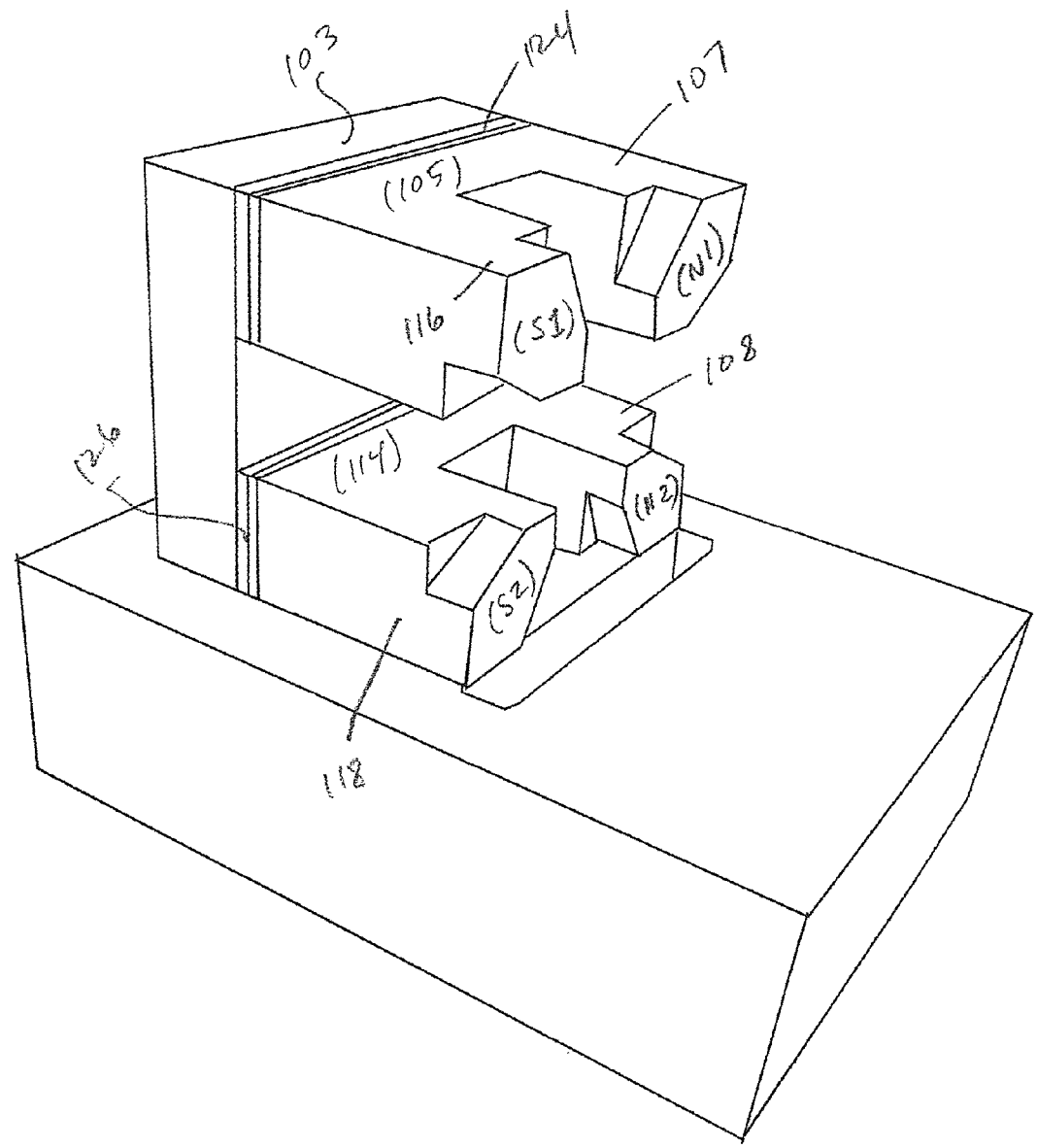
FIG. 3 is a detail drawing of the magnetic flux delivery subsystem without the disk.

FIG. 2 is a detail drawing of the magnetic flux delivery subsystem including the rotating disk, and FIG. 3 is a detail drawing of the magnetic flux delivery subsystem without the disk.

The magnetic flux delivery subsystem comprises a plate 103 to which there is coupled two C-shaped members 105, 114. Each C-shaped member comprises two arms extending away from plate 103 and toward the rotating disk 106. In particular, member 105 includes arms 107, 108, and member 114 includes arms 116, 118. Arm 107 terminates in a flat surface N1; arm 108 terminates in flat surface N2; arm 116 terminates in flat surface S1; and arm 118 terminates in flat surface S2. All of the flat surfaces N1, N2, S1, S2 lie in a common first plane. The ends of the arms 107, 108, 116, 118 are preferably chamfered as shown so that the surfaces N1, N2, S1, S2 better conform to the magnetically conductive wedges of the rotating disk described below.

A magnet is interposed between the back surfaces of one or both of the C-shaped members and the plate 103. As seen in FIGS. 2, 3, two permanent magnets 124, 126 are shown. If two magnets are used, they are arranged in 'series,' that is, with their poles alternating such that their magnetic fields are additive. Arbitrarily, surfaces N1, N2 are 'north' poles, whereas surfaces S1, S2 are 'south' poles. If the magnet(s) are reversed so, too, would these arbitrary poles.

Figure 4:
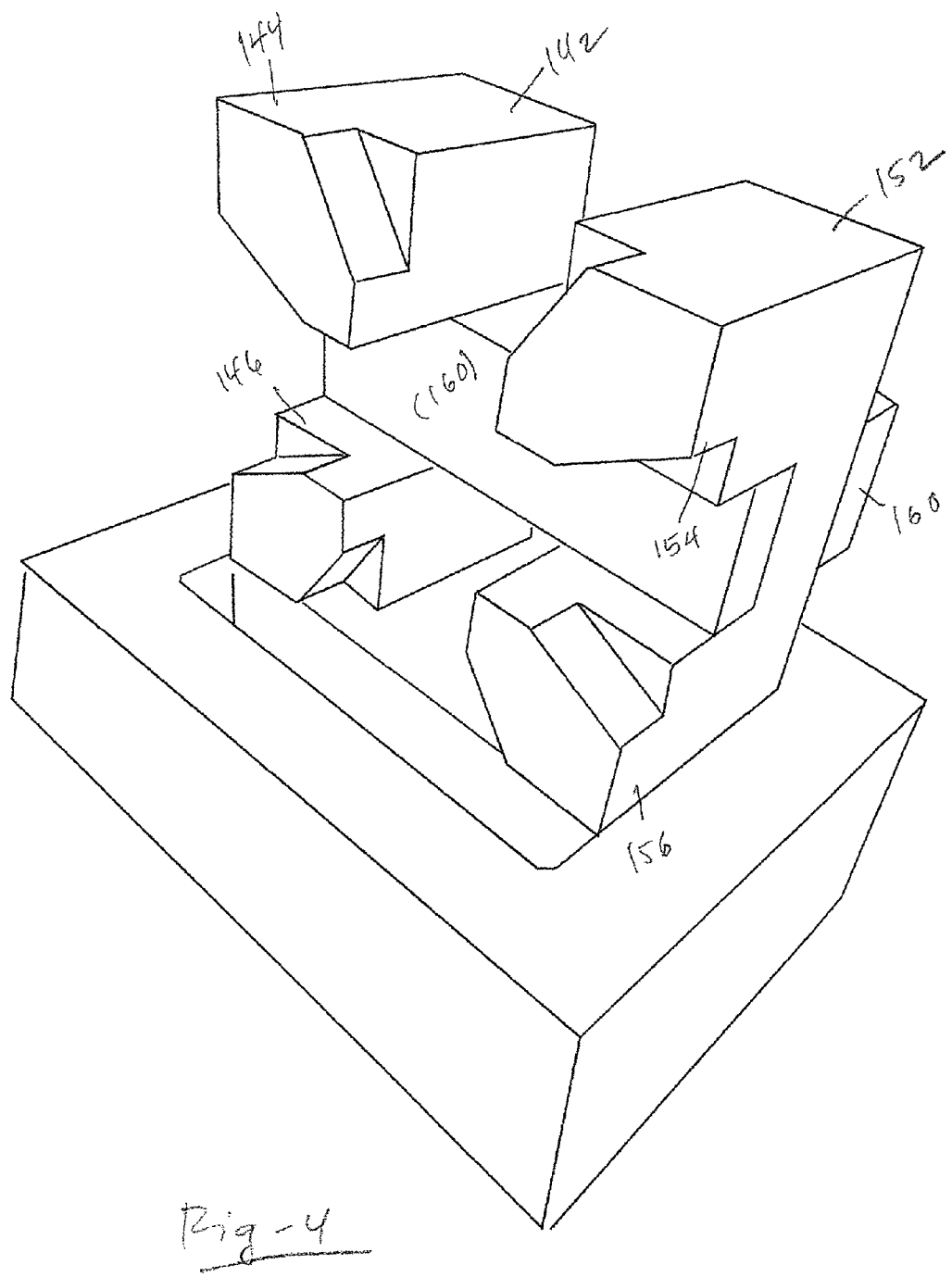
FIG. 4 is a detail drawing of the electromagnetic induction subsystem.

The electromagnetic induction subsystem, illustrated in FIG. 4, also comprises a pair of C-shaped members 142, 152. Each C-shaped member also has a pair of arms oriented toward rotating disk 106. In particular, member 142 includes arms 144, 146, and member 152 includes arms 154, 156. Arm 144 terminates in a flat surface 1; arm 146 terminates in flat surface 2; arm 154 terminates in flat surface 3; and arm 156 terminates in flat surface 4. All of the flat surfaces 1, 2, 3, 4 lie in a common second plane, spaced-apart from and parallel to the first plane.

Continuing the description of the electromagnetic induction subsystem, a bar 160 shown in FIG. 1 is disposed between the mid-sections of C-shape members 142, 152. A coil of wire 164, wrapped around bar 160, is interconnected to a utilization device 166. As described in detail below, during operation, magnetic flux reverses direction through bar 160, thereby inducing an alternating current through wire 164.

The surfaces of the arms associated with the magnetic flux delivery subsystem are axially aligned with the surfaces of the arms associated with the electromagnetic induction subsystem. The first and second planes are spaced apart at a distance to receive rotating disk 106. In the preferred embodiment, the surfaces are as close as possible to the front and back surfaces of the disk while allowing it to rotate freely.

Disk 106 is constructed from a non-magnetic material such as aluminum, but includes six flux-carrying inserts A, B, C, D, E, F best seen in FIG. 2. The wedge-shaped inserts, which extend all the way through the disk 106 from front to back surface, are constructed from a high magnetic permeability material such as iron or other ferromagnetic material. Disk 106 is supported on a rod 130 that rotates about a central axis. The ends of the rod include some form of bearing structure 132 engineered to minimize friction. Needle or gas bearing may be used, for example.

The C-shaped members of the magnetic flux delivery and electromagnetic induction subsystems, as well as bar 160, are preferably constructed from laminated electrical steel material, most preferably HF-10 C5, with laminations having thicknesses in the range of 0.010 inches. Laminations are used to inhibit eddy currents and improve efficiency. In terms of dimensions, the apparatus may be constructed in different sizes. In one example, the various bars have cross sections with dimensions ranging from 0.5 to 1.5 inches. Disk 106 may have a diameter on the order of 14 inches, in which case the surfaces facing the disk are about 0.010 inches apart.

The disk may rotate in either direction, at different speeds, though constant speeds in the range of 1000 to 4000 RPM are preferred. Any mechanical energy may be used to turn the disk, including wind, water, manual cranking, and so forth. The disk may also be motor-driven, using at least a portion of the alternating current produced by the electromagnetic induction subsystem.

Figure 5F:
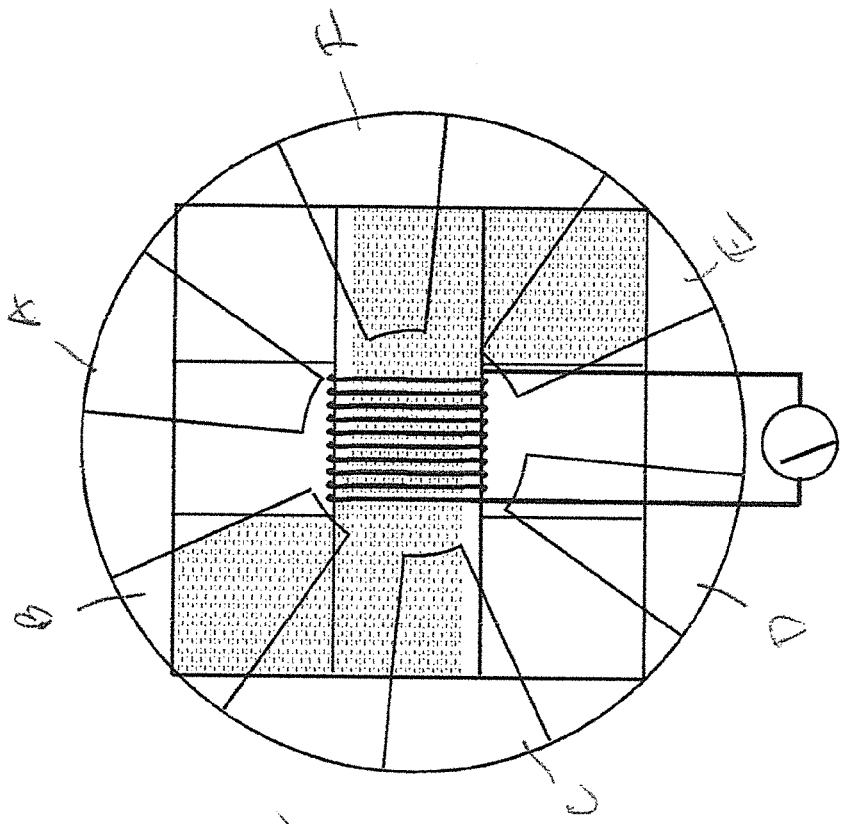

FIGS. 5A-5G illustrate how an alternating current is induced in coil 164 via rotation of disk 106. FIG. 5A illustrates an arbitrary starting position, with rotation arbitrarily proceeding in a counter-clockwise direction. In FIG. 5A, flux from surface N1 of the magnetic flux delivery subsystem (behind insert A), is able to conduct through insert A, into surface 1, through bar 162, through insert D, and into surface S2 of the magnetic flux delivery subsystem (behind insert D). Arbitrarily, then, magnetic flux may be thought of as 'flowing' from right to left through bar 162 around which wire 164 is wound. A meter 500 in series with wire 164 shows a positive current in one direction (assuming continuous rotation and a previous flux reversal as described below).

In FIG. 5B, the disk has rotated 5 degrees CCW. Inserts A, D are no longer as well aligned with the corresponding surfaces of the magnetic flux delivery and electromagnetic induction subsystems, causing the current induced in the coil to diminish somewhat, as indicated by meter 500. In FIG. 5C, at 10 degrees of rotation, the overlap and induced current continue to diminish. In FIG. 5D, the overlap of insert A and surface N1, the overlap of insert B and S1; the overlap of insert D and surface S2, and the overlap of insert E and surface N2 are all equal, resulting in little if any induced current.

Figure 5E:
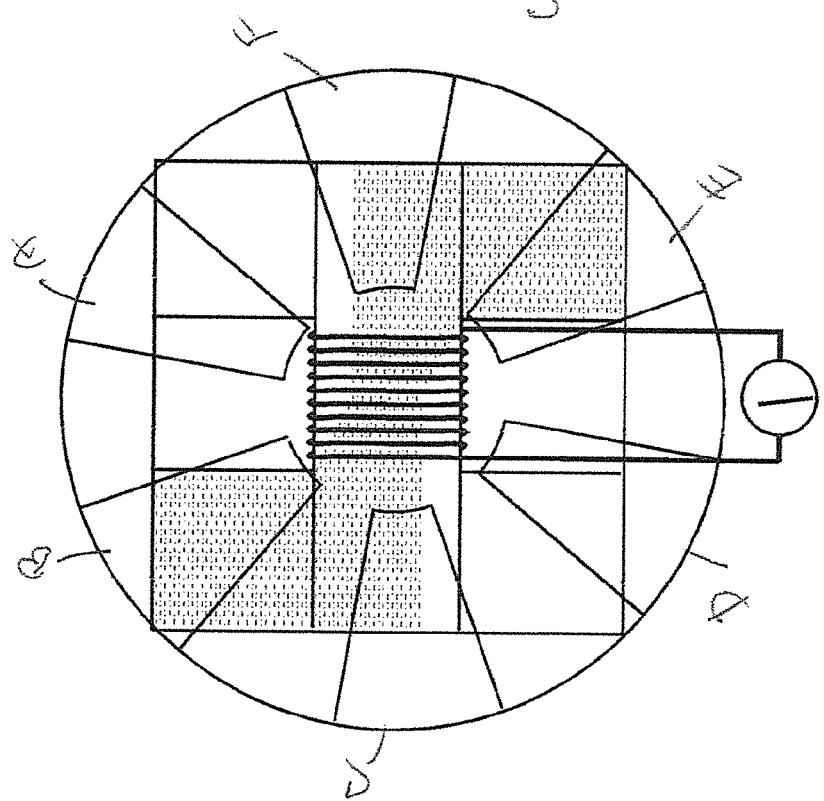
Figure 5G:
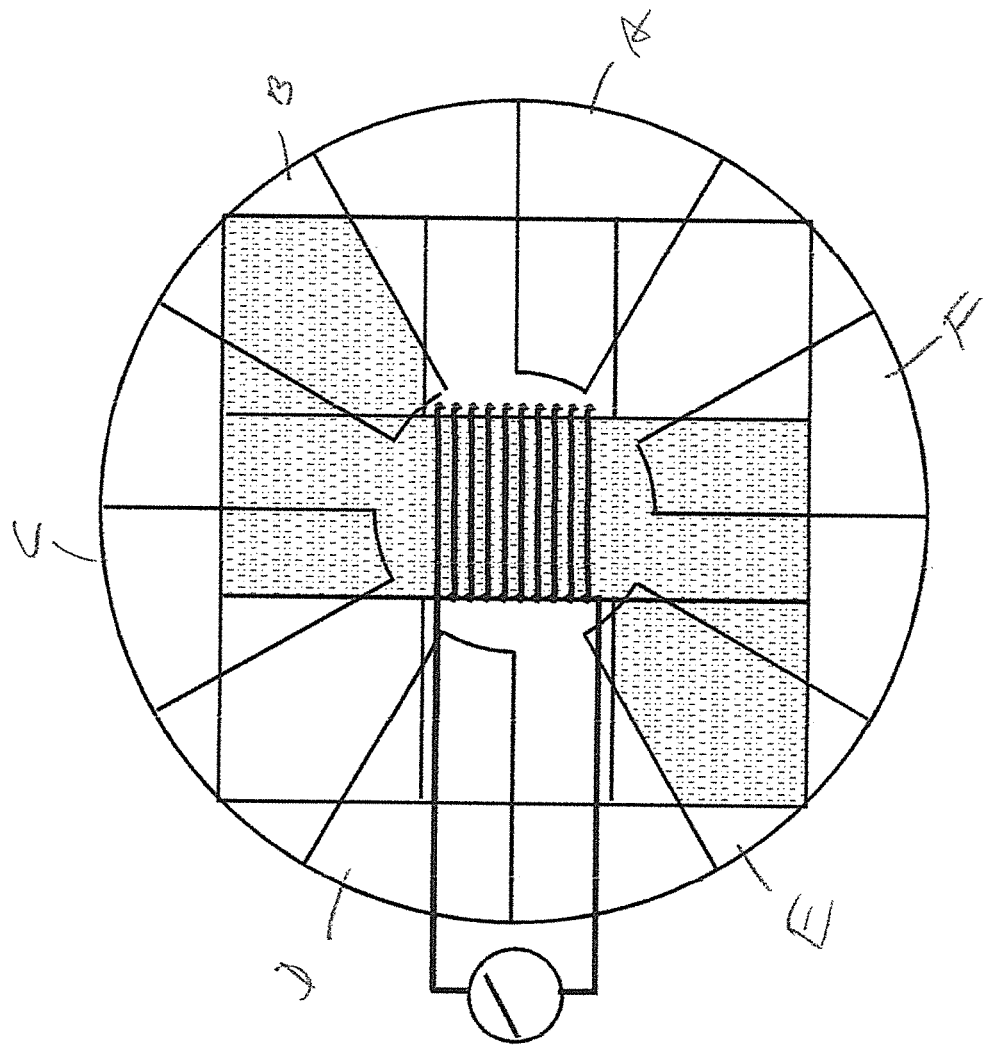
Figure 6:
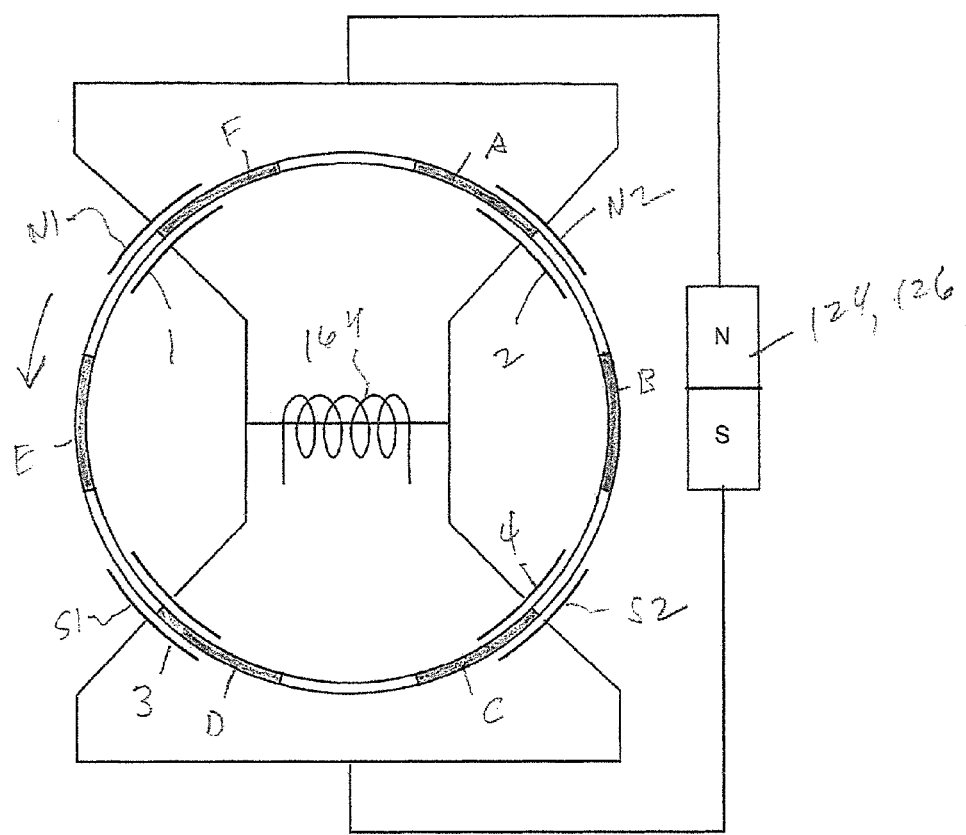
FIG. 6 is a magnetic equivalent circuit of the preferred embodiment.

In FIG. 5E, however, at 20 degrees of rotation, the overlap of inset B and surface S1, as well as the overlap of insert E and surface N2 begin to increase, now causing a left-to-right flux to develop though bar 160. This overlap continues to increase in FIGS. 5F and 5G, maximizing the induced current from left-to-right in the drawing. As rotation continues, the process described above will repeat, involving the other inserts, such that the flux will reverse precisely three times through bar 160 for each full rotation of disk 106.

The invention claimed is:

1. An electrical energy generator, comprising:
   a plate;
   a pair of first C-shaped members, each having a midsection with a back side coupled to the plate;
   each first C-shaped member having a pair of arms extending away from the plate;
   each arm terminating in a surface such that all four of the surfaces are tangent to a first plane;
   at least one magnet disposed between the back of one of the C-shaped members and the plate, such that the surfaces associated with the arms of one of the first members is a north magnetic pole, and the surfaces associated with the arms of the other one of the first members is a south magnetic pole;

a pair of second C-shaped members, each having a midsection with a back side and a pair of arms extending toward the plate;

each arm terminating in a surface such that all four of the surfaces are tangent to a second plane parallel to the first plane;

the surfaces of the arms of the first C-shaped member being aligned with the surfaces of the of the arms of the second C-shaped member in facing relationship across the gap;

a central arm coupling the midsections of the pair of second C-shaped members;

wherein the plate, the first and second C-shaped members, and the central arm are all constructed of a magnetic flux conductive material;

a coil of electrically conductive wire wrapped around the central arm, the wire having two ends interconnected to an electricity utilization device;

a rotating disk with opposing outer surfaces disposed in the gap;

the disk being constructed of a non-magnetizable material with exception of a six spaced-apart, radial inserts of magnetic flux conductive material extending entirely through the disk from one outer surface to the other; and wherein the inserts of the disk and the aligned surfaces of the arms of the first and second C-shaped members being geometrically configured such that as the disk rotates, the magnetic flux from the magnet conducts through the inserts in sequence, thereby reversing the direction of the flux through the central arm, inducing an alternating current in the coil of wire.

* * * * *